UNITED STATES PATENT OFFICE.

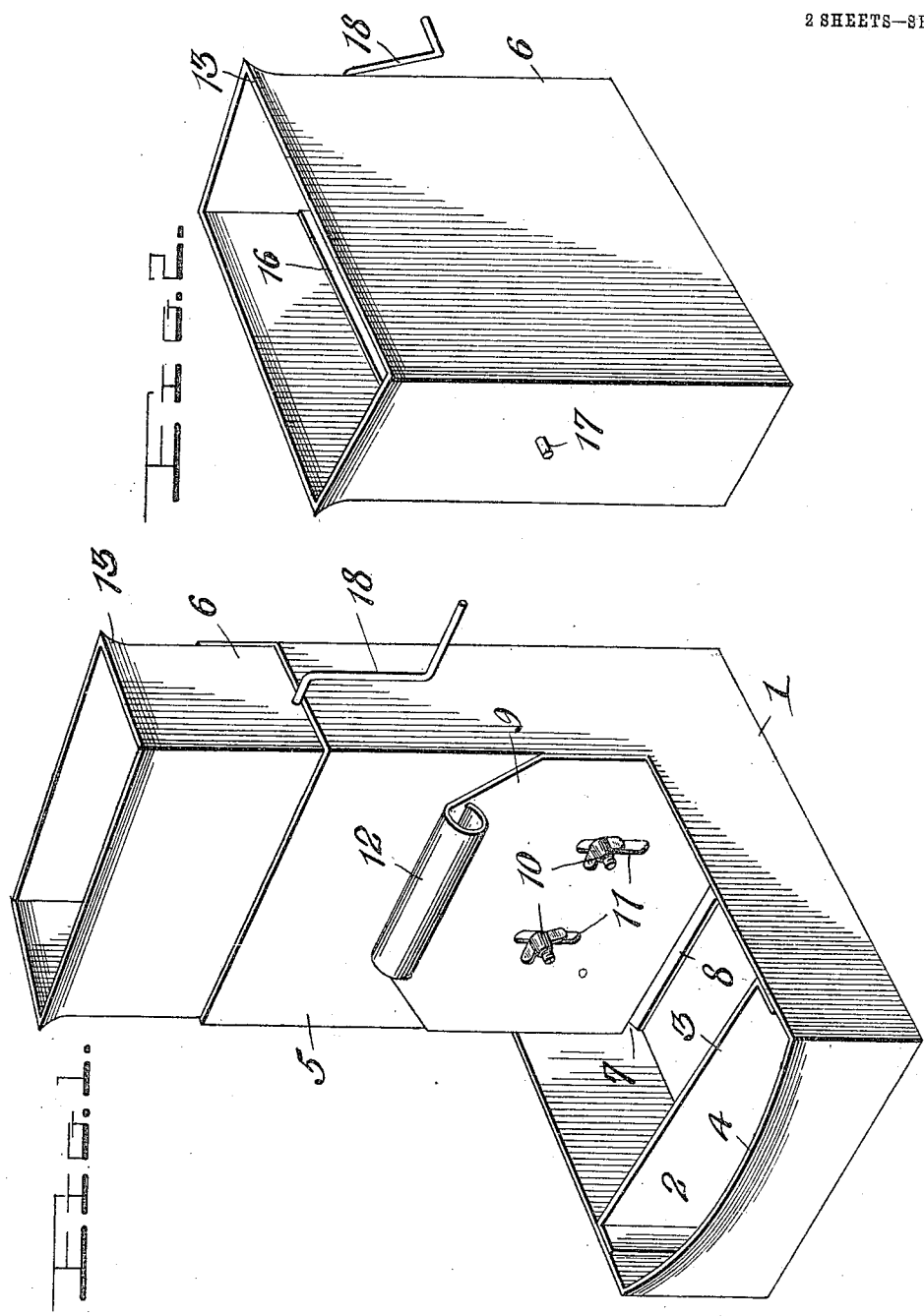

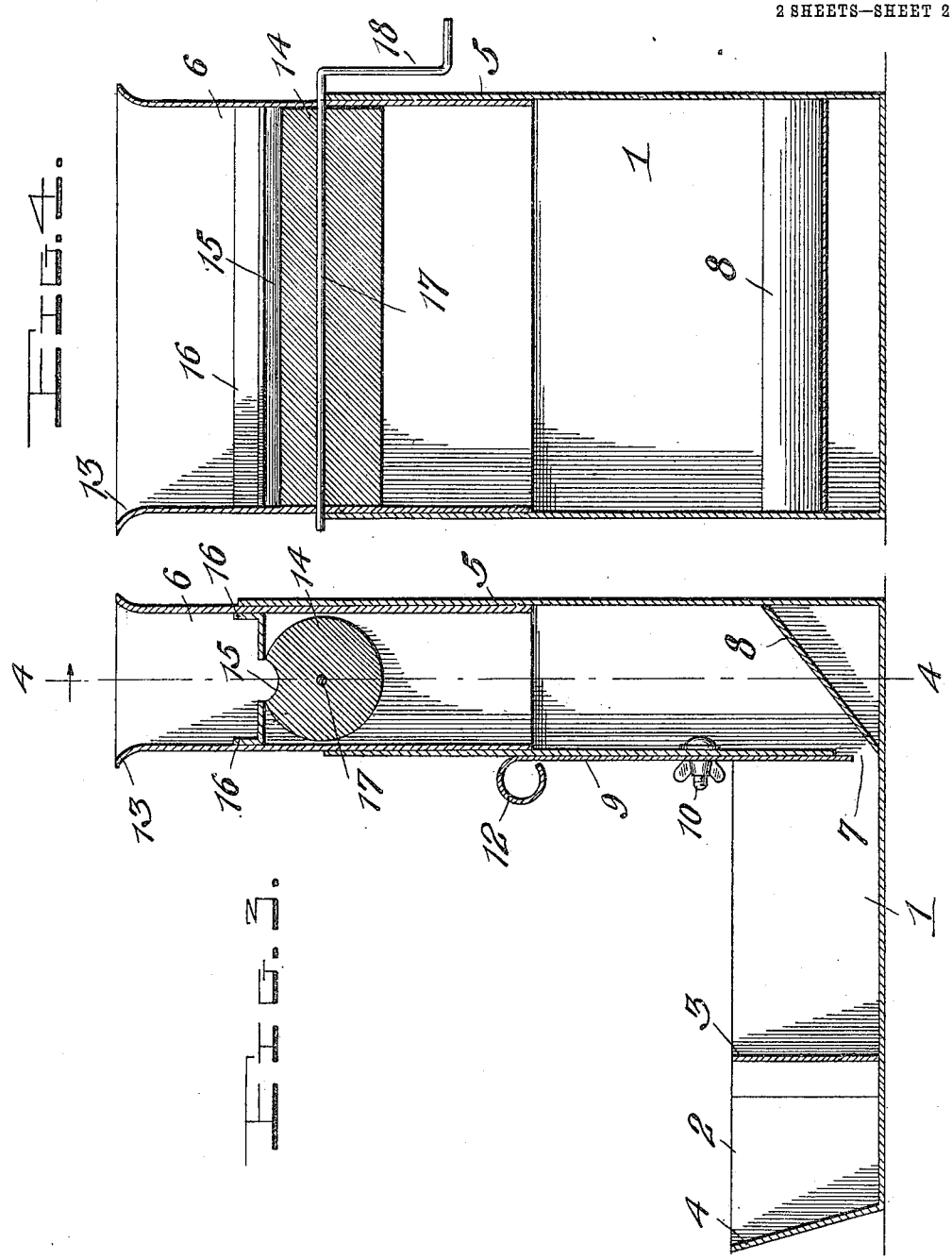

FREDRICK C. GRINER, OF WATERTOWN, SOUTH DAKOTA.

ADJUSTABLE FEED-TROUGH.

962,635.      Specification of Letters Patent.      Patented June 28, 1910.

Application filed February 12, 1910. Serial No. 543,500.

*To all whom it may concern:*

Be it known that I, FREDRICK C. GRINER, a citizen of the United States, residing at Watertown, in the county of Codington and State of South Dakota, have invented certain new and useful Improvements in Adjustable Feed-Troughs, of which the following is a specification, reference being had to the accompanying drawings.

My invention relates to improvements in adjustable feed boxes or troughs for horses and other live stock.

The object of the invention is to provide a simple and practical device of this character which may contain a large quantity of oats or other feed, and which may be adjusted and operated to permit only a limited quantity of feed to be slowly delivered to the horse or other animal whereby it will eat slowly and hence more thoroughly masticate its food.

With the above and other objects in view, the invention consists of the novel construction, combination and arrangement of parts, hereinafter fully described and claimed, and illustrated in the accompanying drawings in which:—

Figure 1 is a perspective view of my improved adjustable feed trough or box; Fig. 2 is a perspective view of the hopper removed; Fig. 3 is a vertical front to rear sectional view; and Fig. 4 is a sectional view taken on the planes indicated by the line 4—4 in Fig. 3.

My invention comprises a feed box or receptacle 1 which if desired, may have at its front a chamber or compartment 2 for salt. As illustrated this compartment 2 is formed by providing in the rectangular box 1 a transverse partition 3 and by bowing outwardly the front wall 4 of the box. Arranged in the rear of the feed box or trough 1 is an upright casing 5 preferably of rectangular shape and adapted to serve as a chute for receiving the oats or other feed from a reservoir or hopper 6 and delivering it slowly to the feed box or trough 1. This casing or chute 5 has its front wall terminating somewhat above the box 1 to provide an outlet opening 7 and the bottom 8 of said chute is downwardly and forwardly inclined toward the opening 7 so that the oats or feed will pass by gravity into the box or trough 1.

In order to regulate the passage of the feed through the opening 7 an adjustable regulating valve or gate 9 is provided, the same being here shown in the form of a slidable plate or sheet arranged on the outer face of the front wall of the chute 5 and adapted to have its lower end regulate the size of said opening 7. This slide valve 9 is guided and secured in adjusted position by means of a pair of bolts 10 which pass through the front wall of the chute and vertical slots 11 in the slide valve, and have thumb nuts upon their forward threaded ends. A finger piece 12 is provided on the slide valve or gate 9 and is formed preferably by reducing and bending the same, as shown in Fig. 1.

The hopper or reservoir 6 for the grain is preferably removably mounted in the open top or chute of the casing 5, and it is likewise of rectangular shape, its lower end being adapted to enter the chute 5, and its upper end having its side and end walls flared outwardly, as shown at 13. For the purpose of making a predetermined quantity of feed to be dropped from the upper portion of the reservoir or hopper into the feeding chute 5 I provide a rotary feeding member 14 in the form of a cylinder having in its periphery a longitudinal groove 15 which may be brought into register with the longitudinal opening or slot formed in the bottom of the hopper by constructing it of angular plates 16, the vertical flanges of which are secured to the inner faces of the front or rear walls of the hopper 6, and the horizontal flanges of which project inwardly and are spaced apart to form the said opening or slot.

The feed member or cylinder 14 is fixed on a longitudinal shaft 17, the ends of which project through and rotate in bearing openings in the end walls of the hopper 6 and are adapted to rest upon the upper edges of the end walls of the chute 5 to limit the downward movement of the hopper in the chute. A crank handle 18 is provided on one end of the shaft 17 and formed preferably by bending the end of said shaft as shown. The groove 15 is preferably of such size as to hold a quart of oats or other feed, or a predetermined quantity of feed so that such quantity will be dropped from the upper compartment or chamber of the hopper into the chute each time the feed member 14 is rotated or oscillated.

In using the invention, a quantity of feed is placed in the top of the hopper or reservoir 6 and when it is desired to feed the horse or other animal the crank handle 18 is rotated once to cause the groove or pocket 15 in the feed member 14 to be brought into communication with the upper compartment of the hopper and to receive a quart or other predetermined quantity of grain, the continued rotation of the feed member causing the groove 15 to be brought to the bottom of said member so that the feed in the groove will be discharged into the chute while the remaining portion of the feed member will close the slot in the bottom of the hopper. The feed dropping upon the inclined bottom 8 of the chute will pass slowly into the trough or box 1 through the opening 7 and beneath the slide 9, which latter may be adjusted to regulate the passage of the feed. Owing to the peculiar construction and arrangement of the parts of my invention it will be seen that only a small predetermined quantity of grain will be dropped or brought within reach of the animal at any one operation of the device, and that such quantity will be slowly fed to the animal. The animal must therefore eat slowly and will consequently more thoroughly masticate the feed. The device will also prevent waste of feed as is obvious.

Having thus described the invention, what is claimed is:

A device of the character set forth comprising a feed trough, an upright chute arranged at the rear thereof and having an open top, a hopper movably arranged in the top of said chute, a rotary feed cylinder arranged within the hopper for discharging the contents of its upper portion into said chute and a supporting and operating shaft for the feed cylinder having its ends extending through and rotatable in the hopper and resting on the upper edge of the chute whereby the latter is removably supported in the chute.

In testimony whereof I hereunto affix my signature in the presence of two witnesses.

FRED. C. GRINER.

Witnesses:
  JULIUS W. DOERSCH,
  HEBERT E. HOMMEL.